April 7, 1953     M. J. BUTTS     2,633,761
PORTABLE CHAIN SAW FILING DEVICE
Filed May 15, 1951     3 Sheets-Sheet 1
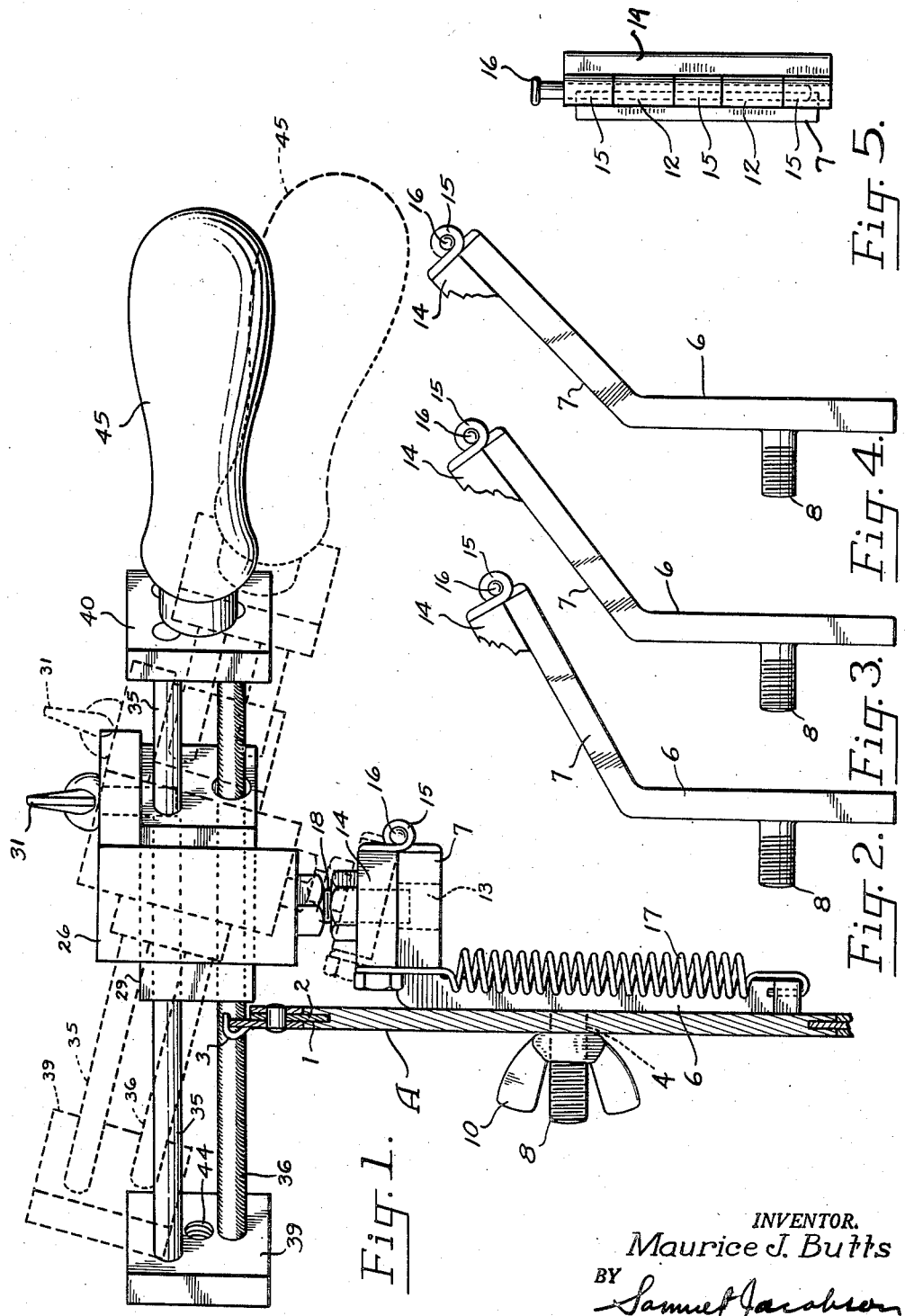
INVENTOR.
Maurice J. Butts
BY Samuel Jacobson
Atty.

April 7, 1953 M. J. BUTTS 2,633,761
PORTABLE CHAIN SAW FILING DEVICE
Filed May 15, 1951 3 Sheets-Sheet 2
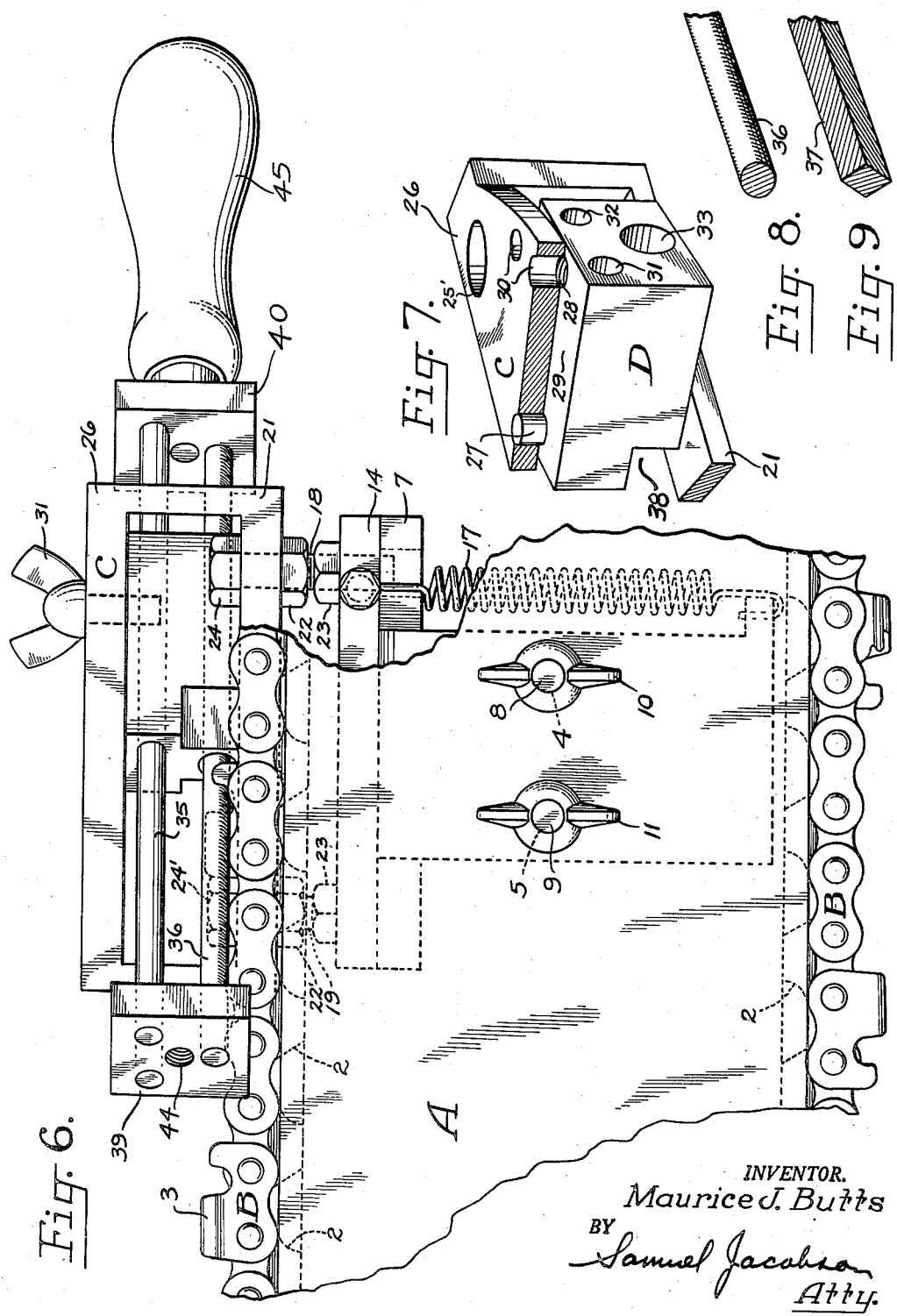
INVENTOR.
Maurice J. Butts
BY
Samuel Jacobson
Atty.

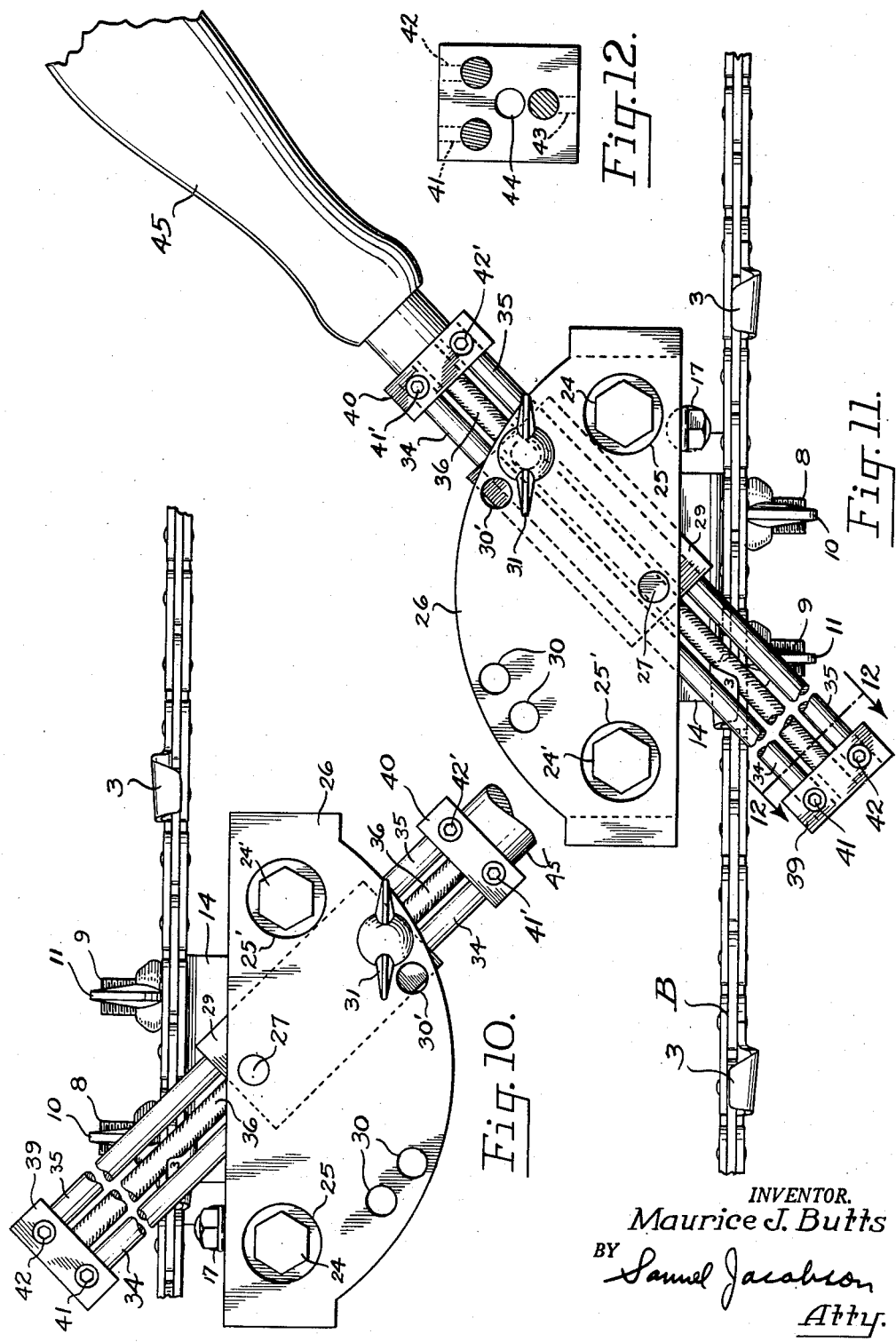

Patented Apr. 7, 1953

2,633,761

UNITED STATES PATENT OFFICE 2,633,761

PORTABLE CHAIN SAW FILING DEVICE

Maurice J. Butts, Eugene, Oreg.

Application May 15, 1951, Serial No. 226,391

7 Claims. (Cl. 76—31)

This invention broadly relates to apparatus for sharpening saws and specifically to devices for filing the teeth of chain saws.

Semi-portable and portable chain saws are now in universal use and are particularly in use on farms and in the forests of America as well as elsewhere. The great demand for chain saws has resulted in the production of different types of such saws to perform specific types of work. As a result there has been developed a great variety of chain saws each with slightly different types of saw teeth—different in contour, setting, angle and spacing, but all aimed at performing with a maximum of efficiency.

It is axiomatic that the effectiveness of a tool for the work for which it is intended is directly proportional to its condition at the time of use. This is unquestionably the case of tools, such as saws in general and chain-saws in particular, the effectiveness of which, is controlled by their sharpness. When chain saws become dull they not only lose their efficiency, but becomes difficult to handle. It is thus imperative that they be maintained sharpened at all times. Since the greatest number of chain saws are used in the woods and farms usually distant from areas where sharpening machines are available, much time is lost when the chain-saws are taken to machine shops for precision sharpening. This, of course, increases the operating costs and, as a result, chain-saw users are reluctant to take the saws to maintenance shops for sharpening. It has, therefore, become the general practice to sharpen these saws by hand in the field. However, not only is this considered an undesirable and slow chore, but such haphazard sharpening oftentimes decreases the efficiency of the chain saw and may even reduce its useful life, since it is practically impossible to file all of the teeth at the same angle, the same depth and to the same degree of sharpness.

It is the primary object, therefore, of my invention to provide a highly portable device for filing chain-saws in the field or on the farm which can be operated by one without special skill in handling files.

Still another object of the invention is to provide a device for sharpening chain-saws having teeth of diverse contours with full assurance that the filing will be done at the proper angle and depth.

Another object of the invention is to provide a filing device which may be adjusted to accurately and speedily sharpen saw-teeth having different cutting edge contours and set at various angles.

Still another object of this invention is to provide a filing device so constructed that it may be used in the field to sharpen the teeth of most types of chain-saws including round, chisel, hooded chisel, rivet pitch and others.

A further object of my invention is to provide a chain-saw filing device particularly adaptable for use in the woods or on the farm but which can easily be adapted for use in a shop.

Another object of the invention is to provide a filing device adapted to hold different types of files in proper relation to the teeth of the saw, provide means for permitting the file to contact each tooth during its reciprocation and thereafter allow it to be raised above the apex of the chain saw, and to provide means for positioning the file in relation to the saw-teeth at a predetermined angle.

A still further object of my invention is to provide, in a filing device, simple yet effective means for making the necessary adjustments to set the device in position for precision filing.

A still further object of the invention is to provide a highly portable, inexpensive, fast, accurate, durable and simple device for sharpening teeth of chain-saws in the woods, on the farm or in the shop.

Other objects and advantages will undoubtedly come to mind as the detailed description which follows unfolds itself. The description must be read in conjunction with the accompanying drawings which illustrate but one embodiment by which the invention may be realized, although it is possible to employ the same underlying principles in other embodiments incorporating slightly different contours and structural characteristics to easily adapt the invention, without material changes therein to other types of chain-saws not illustrated and described herein.

Figure 1 is a side elevation embodying the principles of my invention showing it attached to the bar of a chain-saw and in position to file and illustrating, in dotted lines, the tilting movement of the device to remove it out of filing position;

Figure 2 is a side elevation of a different angled supporting bracket adapted for attachment to the saw bar showing a fragment of the hinge joint;

Figure 3 is a side elevation of another supporting bracket having the same characteristics as the bracket shown in Figure 2, except that the platform portion thereof has a different angular position;

Figure 4 is a side elevation of still another supporting bracket having the same characteristics as brackets shown in Figures 2 and 3 but with the platform portion having still a different angular position;

Figure 5 is an end view of the hinge joint formed between the platform portion of the supporting bracket and the base of the filing device, showing the hinge pin as being removable;

Figure 6 is an elevational view of the device embodying the principles of my invention with the saw bar and saw chain in fragments and showing the filing device embodying my invention in operative relationship to the chain-saw and its attachment to the saw bar;

Figure 7 is a perspective rear view, partially in section, of the file carrier and file carrier supporting frame embodying the principles of my invention;

Figure 8 is a fragmentary perspective of a round type of file used in connection with the file carrier embodying the principles of my invention;

Figure 9 is a fragmentary perspective of a diamond shaped file used in connection with the file carrier embodying the principles of my invention;

Figure 10 is a fragmentary top plan view, embodying the principles of my invention, showing some of its structural characteristics and its relation to a chain saw;

Figure 11 is also a fragmentary top plan view of the device embodying the principles of my invention revealing some of its structural characteristics and shown connected on the side of the saw bar, opposite from that shown in Figure 10; and Figure 12 is an end elevation of one of the rod and file securing wall showing its structural characteristics.

Shown in the drawings by way of illustration only, and to facilitate the description of the invention, is a fragmentary portion of a saw bar, designated generally by reference character A. The saw bar has the usual structural characteristics, such as a slight arcuation of its periphery at its widest part, approximately midway thereof. A circumferential groove 1, usually U-shaped in cross section, is formed within the saw bar at its periphery and forms a case hardened tract around which the chain saw travels. Also shown for illustrative purposes is a fragmentary portion of a chain saw of any well known construction, designated generally by reference character B. The saw chain is made up of the usual linkage forming an endless chain and permitting it to travel about the saw bar A with its guides 2 being confined in groove 1. Saw chain B may have the round type of teeth 3, or any other type of teeth of well known construction. It should, therefore, be understood that the showing of the round type saw teeth 3 in the drawings does not limit the use of the device embodying the invention to the filing of this type teeth only, but it may be used for filing teeth of most types of chain saws.

While, as stated, the device embodying the principles of my invention may be used with almost any type of chain saw, it is necessary, however, to slightly alter the saw bar A before it can be used at all. The alteration does not affect the operation of the chain saw to any degree and consists merely of the precision drilling of two laterally spaced small openings 4 and 5 therein equi-distant from the flattest portion of the saw bar's periphery. Since these openings are small, the rigidity of the saw bar is not materially affected, nor can sawdust pack therein and thus affect the operating efficiency of the chain saw during its operation. After the saw bar has been thus modified, it is ready to have attached to it the device embodying my invention.

The invention itself, in its present embodiment, has a supporting bracket body, consisting of a face plate 6 and a platform 7, and is removably secured to the saw bar A. This is accomplished by having a pair of spaced threaded studs 8 and 9, aligned to fit snugly into openings 4 and 5, extending from face plate 6. No threads are provided on the studs 8 and 9 at their juncture with the face plate 6 for a distance equal to approximately the width of the saw bar A. Thus there can be no free play between the face plate 6 of the supporting bracket and the saw bar when the studs are inserted into the openings and the face plate tightened against the saw bar by the threadable engagement of studs 8 and 9 by wing nuts 10 and 11.

The platform 7 of the supporting bracket body may be positioned at right angles to the face plate 6, as shown in Figures 1, 6, 10 and 11, or at any one of the angles shown in Figures 2, 3 and 4. The angle of platform in relation to the face plate is determined by the type of configuration and pitch possessed by the teeth of the chain saw to be sharpened.

There is provided, as an integral part of each platform regardless of its angle, a plurality of hinge eyes 12 that are formed on the back face thereof, thereby making the platform one leaf of a hinge joint for the purposes hereinafter to be described. A pair of spaced openings 13, but one of which is shown in the drawings is also provided in the platform 7 for the purpose hereinafter to be explained.

A frame supporting base 14, having a plurality of hinge ears 15, forms the other leaf of the hinge joint, when the removable hinge pin 16 interlocks the ears 12 and 15 of the platform 7 and base 14. By providing a reparable hinge joint between the platform 6 and base 13, most chain saws now on the market can be sharpened by the device embodying the principles of the invention herein by the use of any one of the supporting bracket bodies disclosed in the drawings. Base 14 is normally held in tensioned tight relation to the platform 7 by means of a resilient element, such as a coil spring 17 which may be secured in any desirable manner to the base 14 and the lower portion of face 6 of the supporting bracket. It is, of course, obvious that means other than a coil spring as shown might be employed for the purpose of holding the base and platform in tight relationship.

The teeth of saw chains wear from use and sharpening and therefore there must be some means provided for compensating for this wear, in order to assure uniformly sharpened teeth. This is accomplished by providing adjusting means adaptable for bringing the file into the proper elevation for sharpening the teeth. Referring now to Figure 6, it will be noticed that a pair of spaced, externally threaded, adjusting bolts 18 and 19 are in threadable engagement with base 14 which has threaded openings to receive these adjusting bolts in coinciding relationship to the much larger unthreaded openings 13 formed in platform 7.

A file carrier frame, designated generally by reference character C, has a pair of spaced openings 20 (only one of which is revealed in the drawings), formed through the bottom portion 21 thereof in which the adjusting bolts 18 and 19 freely rotate. Threaded upon each of the adjusting bolts 18 and 19, between the bottom portion 21 of the frame and the top of base 14, are pairs of lock nuts 22 and 23 and 22' and 23'. By this arrangement between the adjusting bolts and the various nuts, the file carrier frame may be adjusted in relation to the base 14, to the top of the saw bar A, and to the teeth of the chain saw to whatever alignment that may be desired. To give easier access to the heads 24 and 24' of bolts 18 and 19, a pair of openings 25 and 25' are formed through the top portion 26 of the frame.

A file carrier and guide block, designated generally by reference character D, is movably confined between the top portion 26 and bottom portion 21 of the frame, and is held in lateral pivotal relation thereto, by pin 27 which extends through the top portion of the frame in approximate alignment with, and equi-distant from, openings 20. The file carrier and guide block D is thus permitted to move within the frame C with pin 27 as the axis to thereby inscribe a wide arc and thus allowing the file to do the same in order to permit its proper alignment with the teeth to be sharpened. The structural characteristics of the file carrier and guide block D is best illustrated in Figure 7, which shows a threaded recess 28 formed within the top 29 of the carrier in coinciding relation to pairs of lock openings 30 and 30' formed in a concentric arc at the top 26 of frame C, one of each pairs of openings being positioned at a 30 degree angle considering the pin 27 as the axis, and the other opening of each pair being positioned at a 45 degree angle. Obviously additional openings having other angular relationship to pin 27 may be provided to allow for setting the carrier at any angle desired for guiding the movement of the file in relation to the saw teeth of a chain saw and indicia may be added to the top portion to indicate the angle of each opening. Upon the alignment of recess 28 with any one of these openings 30 or 30' a threaded member such as a wing bolt 31 may be inserted through said opening 30 or 30' and threaded into recess 28 and thus lock the file carrier and guide block at the desired angle.

A pair of externally spaced parallel guide sleeve bores 31 and 32 are formed longitudinally of the carrier D. An opening 33 is also formed longitudinally through the carrier D below the sleeve bores 31 and 32, so that the axis of all of them, when joined together, form a triangle. A pair of rods 34 and 35, snuggly and slidably, fit into sleeve bores 31 and 32 respectively, and a round file 36, or diamond shaped file 37 is freely reciprocable in relation to opening 33. Carrier block D has a transverse cutout, as shown at 38, in order to prevent it from contacting the chain saw when it is moved about its pivot pin 27. Secured to the ends of guide rods 34 and 35 and file 36 or 37, are a pair of end walls or blocks 39 and 40, which not only limit the reciprocation of the rods and file in relation to guide block D, but which also reinforce and maintain in alignment the rods and file assembly heretofore described. These end blocks 39 and 40 have, of course, openings coinciding with the bores 31 and 32 and with opening 33 to receive the ends of the rods and file. However, the diameter of the opening in the end blocks coinciding with the opening 33 of carrier D is less than the diameter of said opening, so that the ends of the file 36 or 37 can be securely anchored therein. These end blocks are removably secured to the rods and file, as illustrated in Figure 2, in any desirable manner, as by retaining screws 41, 42 and 43 and 41', 42' and 43' respectively. Thus it can readily be seen that by releasing these screws the end blocks can be removed and the file changed when desired. In addition to the openings for receiving the rods and the file, there is also provided centrally of each block, a threaded opening 44 into which a handle 45 may be threadably secured. Since such a threaded opening is provided in each end block the manual reciprocation of the rods and file in relation to the guide block may be accomplished from either end.

This completes the detailed description of the invention and the operation of the saw filing device may now be explained. Before the device can be used, it is necessary to first determine which type of supporting bracket should be secured to the saw bar. The choice is entirely controlled by the angle and pitch of the teeth that are to be sharpened. The base of the device is then hinged in position on the chosen platform. The frame of the device is then adjusted in relation to the base and to the top of the saw bar, through the adjusting bolts and nuts, so that it is in proper alignment with the top of the saw bar and with the teeth of the chain saw. Lastly, the position of the file carrier guide block in relation to the bevel angle of the cutting edge of the teeth to be sharpened must be determined. Having positioned the carrier, it is locked into the frame and the device is now ready to be used for filing.

The filing is accomplished by first placing a tooth to be filed against the file and thereafter using slight forward pressure on the tooth, pushing the file forward and releasing the pressure on the tooth on the rearward stroke of the file. Since the teeth on a chain saw are positioned thereon so that their cutting faces are oppositely disposed in alternate relation to each other, only such teeth are filed from on one side of the saw bar as have a like position on the chain saw. (See Figure 10.) After these teeth have been completely filed, the device is then removed from the saw bar and attached on the opposite side of the saw bar to file the remaining teeth of the chain saw. (See Figure 11.) The chain is advanced to the next filing position after each tooth is filed. Since the device is positioned in relation to the saw bar so that the file interferes with the movement of the chain saw, it is necessary to raise the device after each forward and rearward reciprocation of the file in order to permit the chain to be moved to the next filing position, and this is accomplished by raising or lowering the handle, depending on which end it is located and raising the file into the position shown in dotted lines in Figure 1.

From the foregoing description, it will undoubtedly appear that the invention as described satisfies the objects and points out the advantages claimed for this invention. While the invention has been described in connection with a specific embodiment, it should be understood that variants thereof are possible to those skilled in the art. The invention, therefore, in its broader aspect, is not limited to the specific construction herein shown and described, since changes and alterations may be made in the proportions and arrangements of the various parts without departing from the spirit of the invention.

Having thus described my invention what I claim as new and upon which I desire to secure Letters Patent is:

1. In a device of the class described, in combination with the saw bar of a chain saw, a support bracket removably securable to the saw bar and having the angle of its platform portion determined by the configuration and pitch of the teeth of a chain saw, a frame supporting base hingedly and removably secured to the support bracket, resilient means secured to the support bracket and supporting base tending to hold said supporting base to the platform portion of said support bracket, a file carrier frame disposed upon said supporting base, means for vertically positioning said carrier frame in relation to said supporting base for permitting the alignment of the frame in relation to the saw bar and teeth of the chain saw, a file carrier guide block secured within said frame in pivotal relation thereto and adapted to inscribe a wide arc within the confines of said frame, means for locking said guide block in said frame after its alignment in relation to the teeth of the chain saw, a file reciprocably positioned in said guide block, a pair of end walls removably secured to said file to limit its movement in said guide block, means slidably positioned within said guide block to control the reciprocation of said file in relation to said guide block, said means removably secured to said end walls, and a handle removably securable to either of the end walls for assisting in the reciprocation of the file and the raising or lowering of the supporting base on its hinged connection with the supporting bracket.

2. In a device of the class described, in combination with the saw bar of a chain saw, a support bracket removably securable to the saw bar and having the angle of its platform portion determined by the configuration and pitch of the teeth of a chain saw, a frame supporting base hingedly and removably secured to the support bracket, a file carrier frame disposed upon said supporting base, means for vertically positioning said carrier frame in relation to said supporting base for permitting the alignment of the frame in relation to the saw bar and teeth of the chain saw, a file carrier guide block secured within said frame in pivotal relation thereto and adapted to inscribe a wide arc within the confines of said frame, means for locking said guide block in said frame after its alignment in relation to the teeth of the chain saw, a file reciprocably positioned in said guide block, a pair of end walls removably secured to said file to limit its movement in said guide block, means slidably positioned within said guide block to control the reciprocation of said file in relation to said guide block, said means removably secured to said end walls, and a handle removably securable to either of the end walls for assisting in the reciprocation of the file and the raising or lowering of the supporting base upon its hinged connection with the supporting bracket.

3. In a device of the class described, in combination with the saw bar of a chain saw, a support bracket removably securable to the saw bar and having the angle of its platform portion determined by the configuration and pitch of the teeth of a chain saw, a frame supporting base hingedly and removably secured to the support bracket, a file carrier frame disposed upon said supporting base, means for vertically positioning said carrier frame in relation to said supporting base for permitting the alignment of the frame in relation to the saw bar and teeth of the chain saw, a file carrier guide block secured within said frame in pivotal relation thereto and adapted to inscribe a wide arc within the confines of said frame, means for locking said guide block in said frame after its alignment in relation to the teeth of the chain saw, a file reciprocably positioned in said guide block, a pair of end walls removably secured to said file to limit its movement in said guide block, and means slidably positioned within said guide block to control the reciprocation of said file in relation to said guide block, said means removably secured to said end walls.

4. In a device of the class described, in combination with the saw bar of a chain saw, a support bracket removably securable to the saw bar and having the angle of its platform portion determined by the configuration and pitch of the teeth of a chain saw, a frame supporting base hingedly and removably secured to the support bracket, resilient means secured to the support bracket and supporting base tending to hold said supporting base to the platform portion of said support bracket, a file carrier frame disposed upon said supporting base, means for vertically positioning said carrier frame in relation to said supporting base for permitting the alignment of the frame in relation to the saw bar and teeth of the chain saw, a file carrier guide block secured within said frame in pivotal relation thereto and adapted to inscribe a wide arc within the confines of said frame, means for locking said guide block in said frame after its alignment in relation to the teeth of the chain saw, a file reciprocably positioned in said guide block, and a pair of end walls removably secured to said file to limit its movement in said guide block.

5. A device of the class described, to be used with standard chain saws, comprising a support bracket having the angle of its platform portion determined by the configuration and pitch of the teeth of a chain saw, a frame supporting base hingedly and removably secured to the support bracket, resilient means tending to hold said supporting base to the platform portion of said support bracket, a file carrier frame disposed upon said supporting base, means for vertically positioning said carrier frame in relation to said supporting base for permitting the alignment of the frame in relation to the teeth of the chain saw, a file carrier guide block secured within said frame in pivotal relation thereto and adapted to inscribe a wide arc within the confines of said frame, means for locking said guide block in said frame after its alignment in relation to the teeth of the chain saw, a file reciprocably positioned in said guide block, a pair of end walls removably secured to said file to limit its movement in said guide block, means slidably positioned within said guide block to control the reciprocation of said file in relation to said guide block said means removably secured to said end walls, and a handle removably securable to either of the end walls for assisting in the reciprocation of the file and the raising or lowering of the supporting base on its hinged connection with the supporting bracket.

6. A chain saw filing device, comprising a support bracket having the angle of its platform portion determined by the configuration and pitch of the teeth of a chain saw, a frame supporting base hingedly and removably secured to the support bracket, a file carrier frame disposed upon said supporting base, means for vertically positioning said carrier frame in relation to said supporting base for permitting the alignment of the frame in relation to the teeth of a chain saw, a file carrier guide block secured within said frame in pivotal relation thereto and adapted to inscribe a wide arc within the confines of said frame, means for locking said guide block in said frame after its alignment in relation to the teeth of a chain saw, a file reciprocably positioned in said guide block, a pair of end walls removably secured to said file to limit its movement in said guide block, and mean slidably positioned within said guide block to control the reciprocation of said file in relation to said guide block, said means removably secured to said end walls.

7. The construction as set forth in claim 6 and comprising in addition, resilient means secured to the frame and to the support bracket tending to hold said frame to the platform portion thereof.

MAURICE J. BUTTS.

REFERENCES CITED

The following references are of record in the file of this patent:

UNITED STATES PATENTS

| Number | Name | Date |
| --- | --- | --- |
| 346,541 | Gibson et al. | Aug. 3, 1886 |
| 537,827 | Kaempfer | Apr. 23, 1895 |
| 1,754,378 | Waller | Apr. 15, 1930 |
| 1,852,276 | Waller | Apr. 5, 1932 |
| 1,900,084 | Waller | Mar. 7, 1933 |
| 2,323,527 | Ewers | July 6, 1943 |
| 2,484,417 | Mease | Oct. 11, 1949 |